United States Patent [19]

Pemberton

[11] Patent Number: 5,758,101
[45] Date of Patent: May 26, 1998

[54] METHOD AND APPARATUS FOR CONNECTING AND DISCONNECTING PERIPHERAL DEVICES TO A POWERED BUS

[75] Inventor: Adam C. Pemberton, West Redding, Conn.

[73] Assignee: Alliance Peripheral Systems, Inc., Kansas City, Mo.

[21] Appl. No.: 502,575

[22] Filed: Jul. 14, 1995

[51] Int. Cl.$^6$ .................................................... G06F 13/00
[52] U.S. Cl. ............................................................ 395/283
[58] Field of Search .............................................. 395/283

[56] References Cited

U.S. PATENT DOCUMENTS

| | | | |
|---|---|---|---|
| 4,999,787 | 3/1991 | McNally et al. | 364/514 |
| 5,157,771 | 10/1992 | Losi et al. | 395/325 |
| 5,210,855 | 5/1993 | Bartol | 395/283 |
| 5,386,567 | 1/1995 | Lien et al. | 395/700 |
| 5,432,916 | 7/1995 | Hahn et al. | 395/283 |
| 5,454,080 | 9/1995 | Fasig et al. | 395/283 |
| 5,473,499 | 12/1995 | Weir | 361/58 |
| 5,513,373 | 4/1996 | Damkier | 395/836 |
| 5,530,302 | 6/1996 | Hamre et al. | 307/147 |
| 5,530,810 | 6/1996 | Bowman | 395/283 |
| 5,546,017 | 8/1996 | Vitunic | 326/30 |
| 5,555,510 | 9/1996 | Verseput et al. | 364/514 R |
| 5,564,024 | 10/1996 | Pemberton | 395/283 |
| 5,579,204 | 11/1996 | Nelson et al. | 361/685 |
| 5,584,030 | 12/1996 | Husak et al. | 395/750 |
| 5,586,271 | 12/1996 | Parrett | 395/283 |

OTHER PUBLICATIONS

IBM Technical Disclosure Bulletin vol. 29, No. 3 "Control Circuit for Hot Plugging a ROS Cartdridge", Aug. 1986.
SCSI–3 Parallel Interface Working Draft X3T9.2/375R revision 10L pp. 6, 36, 37, 41–46, Jun. 1994.
SCSI–3 Parallel Interface Working Draft X3T9.2/855D revision 12b Annex G, "Removal and Insertion of SCSI devices" pp. 60–61 Oct. 4, 1993.

*Primary Examiner*—Ayaz R. Sheikh
*Attorney, Agent, or Firm*—Hovey, Williams, Timmons & Collins

[57] ABSTRACT

A connector for use with peripheral devices connected to computer systems via a bus includes protection circuitry for protecting the bus signal lines from unwanted signals, thus allowing a peripheral device to be connected to or disconnected from the bus without removing power from either the computer system or the bus. The connector also provides circuitry for detecting a bus free condition (i.e., no data is being transmitted over the bus), and circuitry for releasing the protection circuitry only after said bus free condition is detected. After the protection circuitry is released, the connector maintains normal signal levels such that the peripheral device may communicate with other devices on the bus. The connector also provides an indicator that it is safe or not safe to connect or disconnect a peripheral from the powered bus. The connector also includes circuitry which, when coupled to the bus, provides active termination in accordance with the SCSI bus protocol.

6 Claims, 4 Drawing Sheets

METHOD AND APPARATUS FOR CONNECTING AND DISCONNECTING PERIPHERAL DEVICES TO A POWERED BUS

BACKGROUND OF THE INVENTION

This invention is an improvement to the invention described in co-pending application titled "Method and Apparatus for Connecting and Disconnecting Peripheral Devices to a Powered Bus," Ser. No. 08/284,352 filed Aug. 2, 1994 which now U.S. Pat. No. 5,564,024.

This invention relates generally to computer systems and in particular to peripheral devices which are connected to a computer system via a bus.

As it is known in the art, computer systems generally include at least one central processing unit (CPU), a memory, and some type of mass storage device such as a disk drive. A typical computer operates by reading and executing program instructions which have been read from a mass storage device and placed in the memory.

As is also known in the art, mass storage devices are typically coupled to a computer system via bus which operates in accordance with a so called bus protocol. The protocol defines the nature of the signals used to produce a proper interface between the computer system bus and the mass storage device. One such protocol in wide use today is the so called Small Computer System Interface (SCSI), defined by ANSI standard X3.131-1986.

The Small Computer System Interface is a widely implemented standard for transferring data between a host computer and a peripheral device such as magnetic hard disk, streaming tape backup mechanism, CD-ROM drive, or other peripheral device. The SCSI standard allows up to seven devices to be connected to the host in a so called daisy-chain configuration. Each device in the chain has a unique ID, numbered 0 through 6 (ID 7 is reserved for the host). A chain of devices connected in this fashion is typically referred to as a SCSI chain.

Many business applications, such as multimedia development or database management applications, run on typical computer systems, require access to extremely large data files typically stored on commensurately large capacity (e.g. greater than one gigabyte) storage devices. Although these large capacity storage devices provide adequate storage solutions, their cost can be prohibitively expensive. As such, many small businesses will own as few as one such device and share it among many users.

The modern trend in accommodating many users sharing a single large capacity storage device is through the use of a network. With a network, several computer systems are linked either together or to common resources such as high capacity storage devices or both. Although this arrangement provides a measure of convenience for each user, each computer connected to a network requires additional hardware and software to facilitate connection to the network. Additionally, at present network technology, data transfer rate over a network does not match the rate at which data can be transferred to and from a processor via a storage device directly connected to the computer via a bus such as the SCSI bus described above. As an example, graphics departments, multimedia developers, and database creators routinely share large files (50 Megabyte or more). The network approach to sharing the files typically requires the use of a local area network (LAN). Such networks transfer data at a relatively slow (approximately 10 Mbit/sec) transfer rate. The slow transfer rate of the currently implemented network protocols degrades performance on both sending and receiving computers (and fileservers, if used) while the file transfer takes place. With these networks, the transfer of a typical file from a large capacity device can range from 10 to 60 minutes or more, depending on file size. In addition, other network traffic suffers while these large files are transferred.

Another approach involves the use of a removable media storage solution. The removable media may be, for example, a hard disk, optical, or magneto-optical mechanism that is designed to accept storage media in the form of a removable cartridge. This facilitates the exchange of large amounts of data between users who have such a mechanism connected to their computer. In general, the transfer rate of removable media drives is comparable to that of the SCSI interface. However, the cost of placing such a mechanism on every user's desktop can be prohibitive to many smaller businesses.

As a result of the above described limitations, many businesses have resorted to swapping large capacity storage devices among multiple computer systems. That is, when one user requires access to one of the large files stored on a large capacity storage device, the device will be physically disconnected from one computer and reconnected to the system needing access to the data files. Although physically moving devices among several computer systems alleviates many of the problems described above, this technique is not without its own drawbacks.

As stated in most user manuals supplied with computer systems or adapter cards incorporating the SCSI bus protocol, and in manuals supplied with peripheral devices designed to operate in accordance with the SCSI protocol, there are certain requirements which must be followed when connecting or removing SCSI devices from the SCSI chain.

Before physically connecting (or removing) a device to the SCSI chain (i.e., plugging the SCSI cable onto the device), all devices in the chain, including the host, must be turned off. This requirement is due to the design of the SCSI controllers used in both the host computer and the target SCSI devices, and is further due to the possibility that signal noise arising from the physical connection or removal of a peripheral device to the powered bus (a hot-swap) may corrupt data being transmitted elsewhere on the bus. Failure to adhere to the requirements may result in permanent electrical damage to both the host system and the peripheral device, and/or corruption of data transmitted on the bus at the time of the hot-swap.

This limitation of powering down all devices (including the computer) before adding or removing a device from the SCSI chain prevents the easy sharing of a SCSI device between different computers. Users must stop any work in progress, power down the system, attach a SCSI device (obeying rules of SCSI termination) and then restart the computer. To share a single hard disk, this requires two shutdowns and two power-ups as the peripheral device is removed from the first computer (after being powered down first) attached to the second computer (after being powered down first) and then both computers restarted. The result is a complete interruption of all work in progress on both computers, and loss of the time required for the shut-down/restart cycles. In practice, this means devices that could be shared (hard disks drives, tape backup drives, scanners, printers, etc.) are not shared due to the inconvenience.

The power down requirement causes a specific inconvenience for users of the Macintosh Powerbook model portable computers. This popular model provides the unique capability of performing both as a host computer (to which SCSI peripherals may be connected) or as a SCSI hard disk (which may be connected to another host computer). When performing as a SCSI hard disk, the Powerbook is referred to as being in a so called docked mode. In the docked mode, Powerbooks are often connected to a desktop computer for the purpose of exchanging data over the SCSI bus. In practice, due to the limitation of powering down all devices, the connection of a docked Powerbook to a desktop computer is inconvenient.

Furthermore, in order to conform to the SCSI bus protocol, each end of the SCSI daisy chain arrangement needs to be physically terminated. Termination of a SCSI device typically involves providing, at each end of the SCSI chain, a 330 ohm resistance between each signal line and a ground potential, in addition to a 220 ohm resistance between each signal line and +5v. For SCSI devices designed to be mounted internally within the CPU enclosure, termination is typically supplied via a number of single in-line resistor packages (SIPs) which are socketed to a circuit board associated with the internal device. External SCSI mechanisms (i.e. those having their own power supplies, enclosure, etc.) may be configured to provide termination in a similar manner. However, to facilitate the daisy chaining of external peripheral devices, the termination is often provided in the form of a connector which is coupled to an external port of the last SCSI device in the SCSI chain. The connector includes similar SIPs to those used with internal devices and thus provides the required termination. This type of so-called "passive termination" does not always provide the proper termination parameters for the SCSI bus, particularly in complex, multiple-device chains. Moreover, use of a passive terminator does not allow for hot-swapping of devices on a SCSI chain.

To provide improved termination, a digital active termination circuit may be employed. Digital active termination provides a way to actively regulate the voltage and impedance on all the SCSI data and control lines. However, digital active termination alone does not provide any protection to the devices on the SCSI chain during addition or removal of a device from the active (powered) chain.

SUMMARY OF THE INVENTION

In accordance with the present invention, an apparatus includes a connector for coupling a peripheral device to a powered bus. Computer software may be provided allowing selection of "add," "remove," or "swap" options, thereby enabling the coupling and/or decoupling procedure for these options via a series of interface screens.

The powered bus includes a plurality of signal lines including a logic ground signal line, a bus power signal line, as well as control and data signal lines. The peripheral device similarly includes a plurality of signal lines including a logic ground signal line, a bus power signal line, and control and data signal lines. During normal operation of the peripheral device, the connector provides proper signal levels on each of the plurality of bus signal lines. Additionally, when a peripheral device is being disconnected or connected to the powered bus, the connector protects all bus signals from potentially damaging signals present at the peripheral device. With such an arrangement, a peripheral device can be connected to or disconnected from a powered bus without the need to remove operating power from the bus or the computer system to which it is connected.

Further, in accordance with the present invention, a method of removing a peripheral device from a powered bus includes inserting a high resistance in series between a first bus power signal line, first control and data signal lines, and a coupling means. The coupling means provides for an electromechanical connection between the first plurality of signal lines and the second plurality of signal lines. The method further includes maintaining the high series resistance while the second plurality of signal lines is disconnected from said coupling means. This causes the second logic signal ground to be disconnected from the first logic signal ground after the second bus power signal line is disconnected from the first bus power signal line and after the second control and data signal lines are disconnected from the first control and data signal lines. With such a method, a peripheral device can be removed from a powered bus without the need to remove operating power from the bus or the computer system to which it is connected.

Further, in accordance with the present invention, a method of adding a peripheral device to a powered bus includes inserting a high resistance in series between said first bus power signal line, first control and data signal lines, and a coupling means. The coupling means provides for an electromechanical connection between the first plurality of signal lines and the second plurality of signal lines. The method further includes maintaining the high series resistance while the second plurality of signal lines are connected to the coupling means. This causes the second logic signal ground to be connected to the first logic signal ground before the second bus power signal line is connected to the first bus power signal line and before the second control and data signal lines are connected to the first control and data signal lines.

The method further includes monitoring the powered bus to detect a bus safe condition (during which no data is transmitted on the bus) so that upon detection of said bus safe condition the said high series resistance is removed from between the first bus power signal line, the first control and data signal lines, and the coupling means. With such a method, a peripheral device can be added to a powered bus without the need to remove operating power from the bus or the computer system to which it is connected.

BRIEF DESCRIPTION OF THE DRAWINGS

The invention is pointed out with particularity in the appended claims. The above and further advantages of this invention may be better understood by referring to the following description taken in conjunction with the accompanying drawings, in which:

FIG. 4b is a continuation of FIG. 4a.

DETAILED DESCRIPTION OF THE PREFERRED EMBODIMENT

Figure 1:
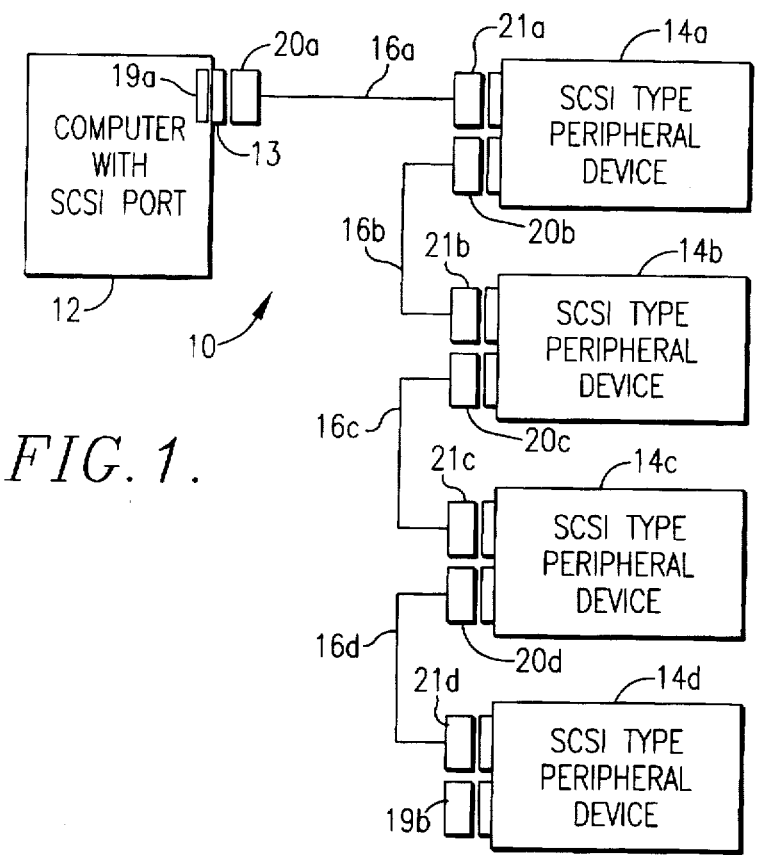
FIG. 1 is a diagram of a computer system including several SCSI type peripheral devices.

Referring now to FIG. 1, computer system 10 is shown to include a central processing unit (CPU) 12 coupled to external peripheral devices 14a–14d. CPU 12 further includes peripheral connection port 13. The port is configured for connection to a particular type of peripheral device, for example, those operating in conformance with the Small Computer Systems Interface (SCSI) protocol. As such, port 13 provides an electromechanical connection between a connector 20a and an input/output (I/O) controller (not shown) within CPU 12. Port 13 is connected to the I/O controller via a signal bus (not shown) and configured to provide the proper electrical connection between the I/O controller and the peripheral devices 14a–14d. In a preferred embodiment of the present invention, the I/O controller, signal bus, and port 13 will be designed to accommodate the connection of peripheral devices conforming to the SCSI protocol. Thus, peripheral devices 14a–14d conform to the SCSI protocol.

Still referring to FIG. 1, peripheral devices 14a–14d are coupled to CPU 12 in a so called daisy chain arrangement. That is, peripheral device 14a is coupled directly to CPU 12 while peripheral device 14b is connected to peripheral device 14a. The data path between device 14a and CPU 12 is provided via signal cable 16a which includes connectors 20a and 21a coupled to opposite ends. Connectors 20a and 21a provide the electromechanical connection between CPU 12 and cable 16a and cable 16a and device 14a respectively. Although not directly connected to CPU 12, a signal path is established between peripheral device 14b and CPU 12 via peripheral device 14a since peripheral device 14b is coupled to peripheral device 14a via signal cable 16b and connectors 20b and 21b. A signal path between remaining peripheral devices 14c–14d and CPU 12 is provided in a like manner. Additionally since the SCSI standard requires physical termination at the location of the first and last devices on the chain, the first device (typically an internal storage device) is terminated within the CPU via terminator 19a, and the last device (14d, for example) is terminated via external terminator 19b.

Figure 6:
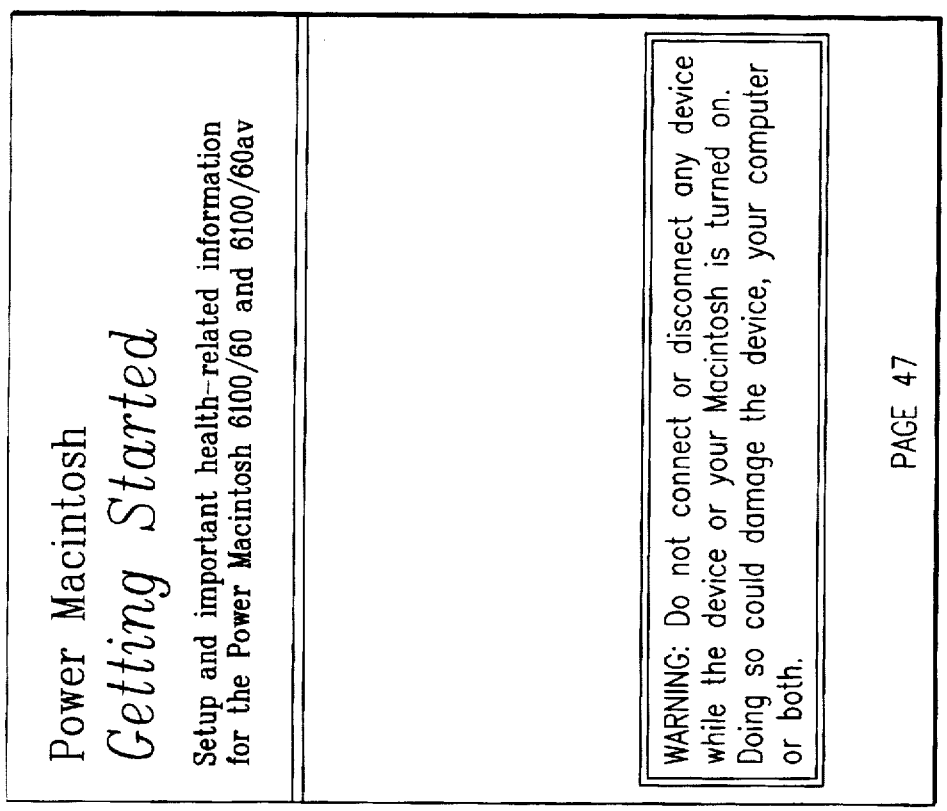
FIG. 6 is an excerpt from the Apple Computer documentation that describes how to connect SCSI devices to a SCSI chain.

Once computer system 10 is powered and running, in order to comply with the SCSI protocol, no additional SCSI devices may be added and none may be removed without following the proper procedures. Referring now to FIG. 6 (page 74 from the Apple Computer Getting Started manual for the Power Macintosh computer model 6100), the proper procedure includes turning off the power to the computer system and each SCSI device in the chain. FIG. 6 lists the Apple Computer warning for attaching a SCSI device to a computer, and this specifically warns the user not to do so while the computer or any device is turned on.

Powering down the computer system also requires saving open files and quitting all software applications which may have been running on the computer system. This powering down procedure can take many minutes and lead to lost productivity. Additionally, according to SCSI termination rules, if the last device in the daisy chain of devices is removed, proper termination must be reestablished at the location of the new last device.

Figure 2:
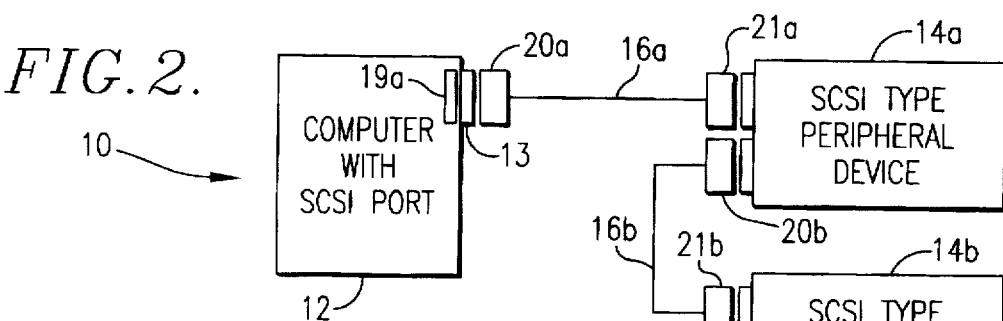
FIG. 2 is a diagram of a computer system including several SCSI type peripheral devices and an additional connector.

According to one aspect of the present invention, a connector is provided which provides the capability of adding and removing devices from a computer system without having to power down the computer system. Referring now to FIG. 2, computer system 10 is shown to include an in-line connector 30 coupled between connector 21d and peripheral device 14d. With connector 30, the last device in the SCSI chain (e.g., peripheral device 14d) can be removed or replaced without requiring that computer system 10 be powered off.

Further, no device at all is required to be connected to connector 30 (e.g., device 14d may be removed from the chain). Since connector 30 provides termination, the SCSI bus will operate properly with connector 30 providing the end of chain termination (connector 30 replaces external terminator 19b of FIG. 1), with or without a device connected to it. Therefore, by configuring connector 30 at the end of a cable attached to the last device (e.g., device 14c), access to the SCSI bus is provided for any device (e.g., device 14d) without first having to remove a device.

Figure 3:
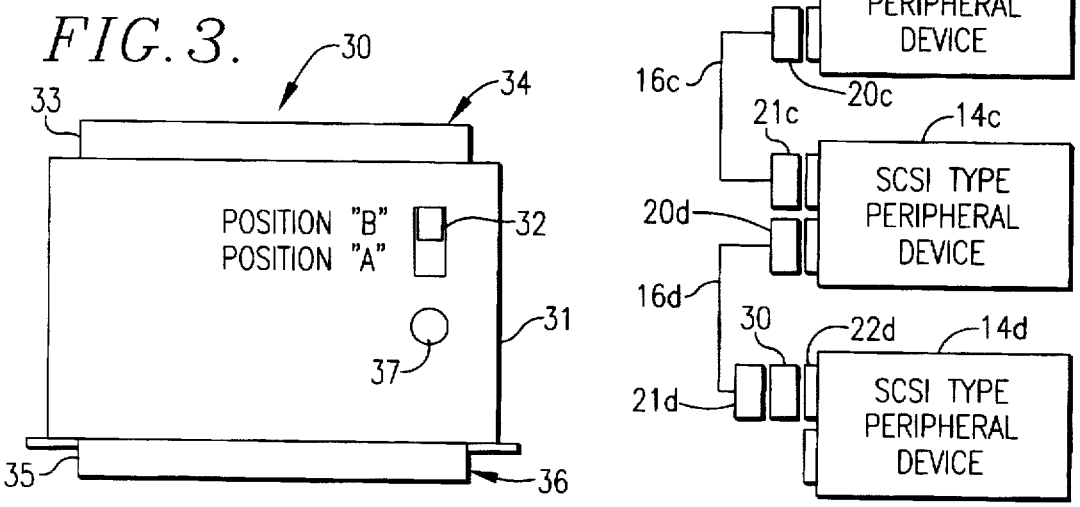
FIG. 3 is a diagram of the connector of FIG. 2.

Referring now to FIG. 3, in-line connector 30 is shown to include a body 31, a switch 32, an LED indicator 37, and interface connections 34 and 36. According to the preferred embodiment of the present invention, connector 30 is configured such that interface connections 34 and 36 provide proper physical engagement to a Centronics type 50 pin connector which is commonly used with SCSI peripheral devices. Typically, interface connection 34 is attached to a cable that is connected to the last device on the chain and interface connection 36 is used to make a connection to a new last device or another SCSI peripheral.

Figure 4A:
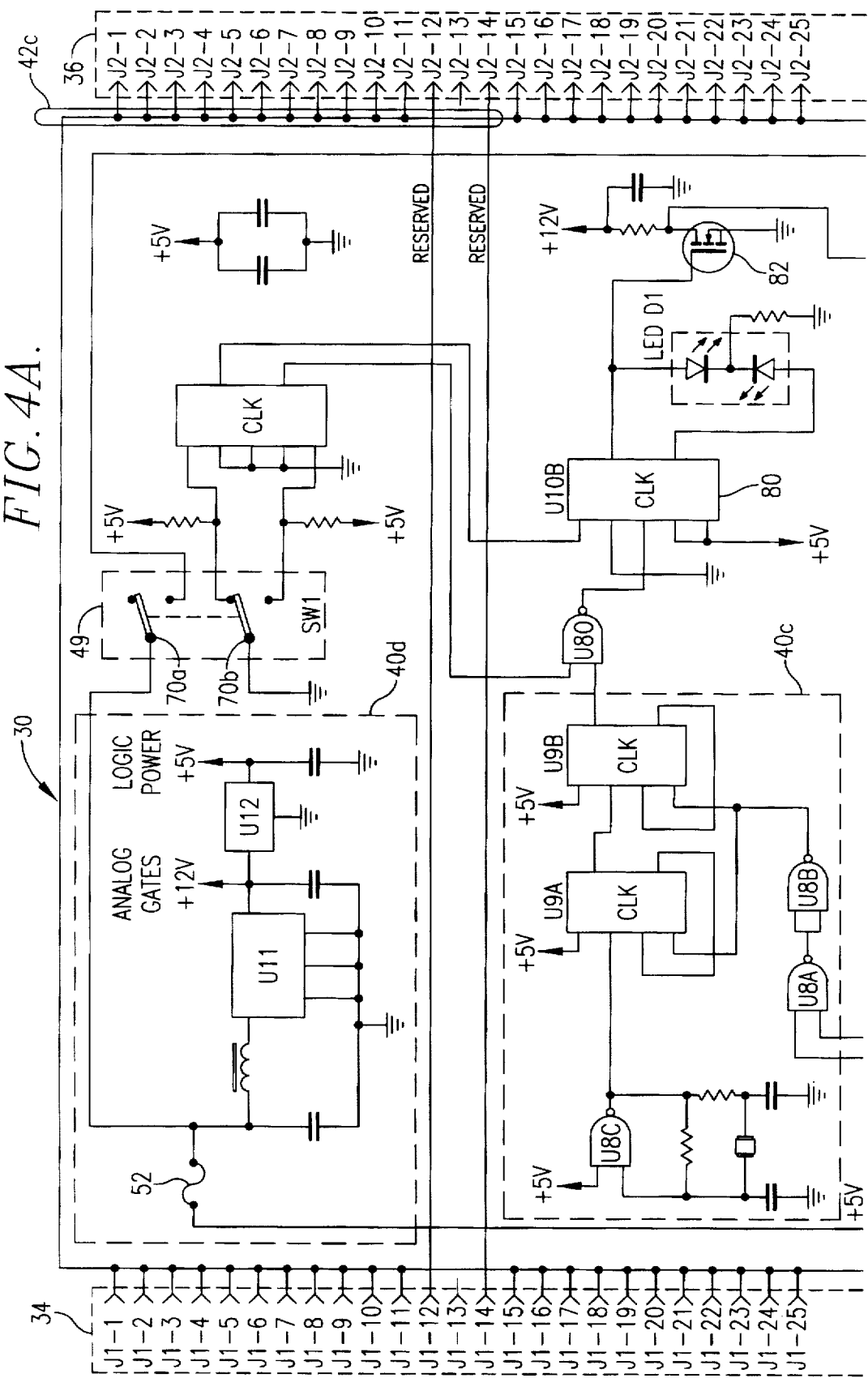
FIG. 4a is a schematic diagram of the circuitry contained within the connector of FIG. 3.
Figure 4B:
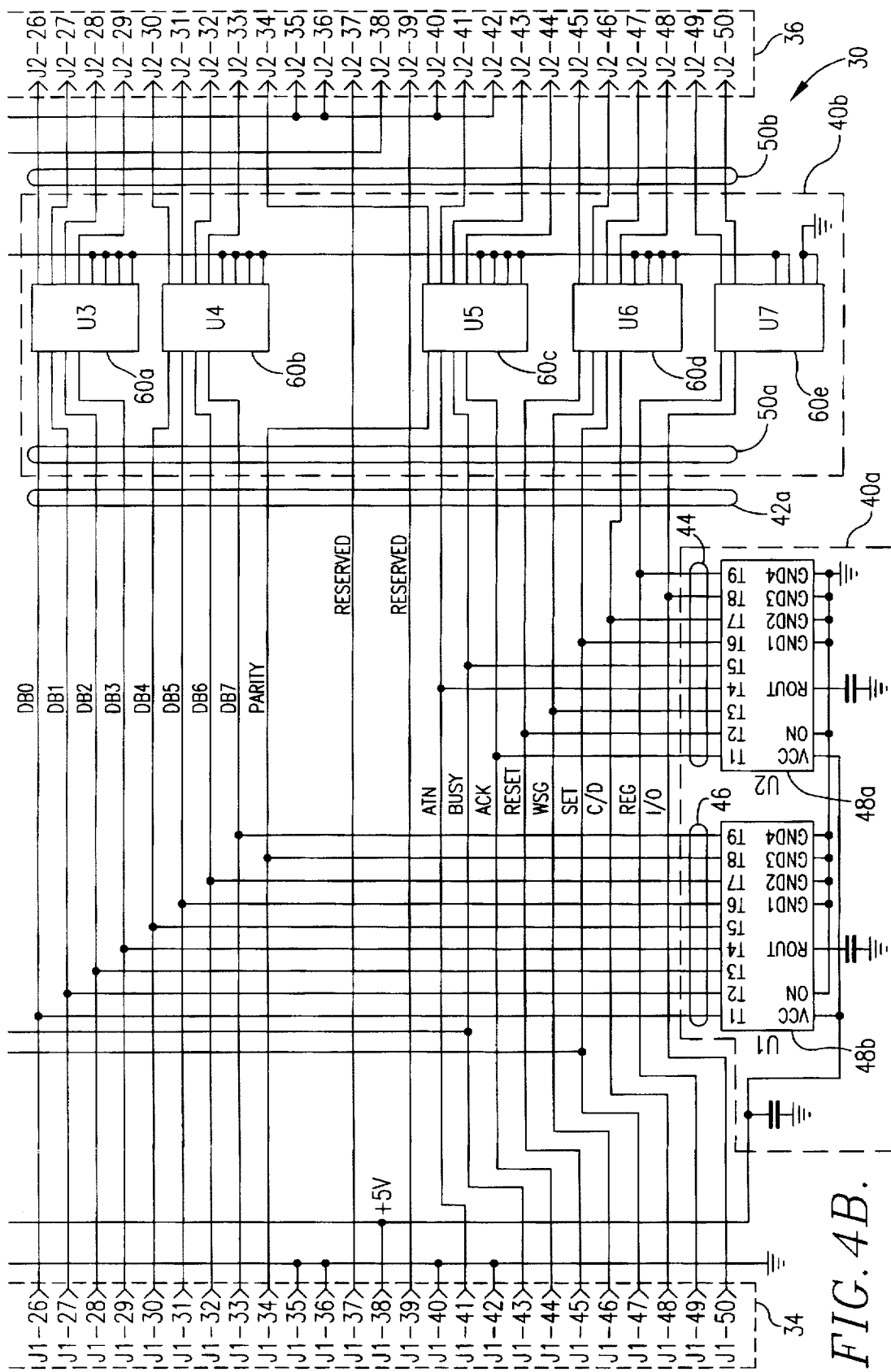

Referring now to FIG. 4, connector 30 is shown to further include termination circuit 40a coupled to signal lines 42a via signal lines 44 and 46. Signal lines 42a and 42c are coupled to the 50 interface pins of interface connection 34. Termination circuit 40a includes 9-line SCSI active terminators 48a and 48b such as the Unitrode model UC5603. Outputs T1–T9 of terminator 48a are coupled to a subset of signal lines 42a (e.g. the SCSI control signal lines) via signal lines 44. Terminator 48a has its Vcc input coupled to the bus power (+5v) signal line of signal lines 42a. Additionally, the ground inputs of terminator 48a are coupled to a ground reference potential.

Outputs T1–T8 of terminator 48b are coupled to the data lines (Data 0–Data 7) of signal lines 42a via signal lines 46. Output T9 of terminator 48b is coupled to a parity data line. Like terminator 48a, the Vcc input of terminator 48b is coupled to the bus power (+5v) signal line of signal lines 42a.

Connector 30 is shown to further include interrupt circuit 40b coupled to signal lines 50a and 50b. Interrupt circuit 40b inserts a single transmission gate (such as type 4066) in series on each of the 18 control and data signal lines 42a (reserved signal lines are not affected), such that the transmission gate is the only component (in series) between interface connection 34 and 36, for each signal line so modified. As shown in circuit 40b, transmission gates 60a–60e include four transmission gates per package. Further, each transmission gate in each of 60a–60e has only two states: "on" or "off." In the on state, each gate acts like a closed single-pole/single-throw switch with minimal series resistance. The on state series resistance of the transmission gate should be less than 40 ohms, or it will degrade the signal passing through the gate. If the on resistance is less than 40 ohms, data will be transmitted bi-directionally through the transmission gate with no effect on the integrity of the data being transmitted. In the off state, the gate acts like an open single-pole/single-throw switch, and inserts a high (typically 20 megohms or greater) resistance between the interface connectors 34 and 36, for each of the 18 control and data signal lines of signal lines 42a.

In addition, all of the logic ground signal lines of the signal lines 42c are coupled together and there is a one to one correspondence between the interface pins of interface connection 34 and the interface pins of interface connection 36, for the logic ground signals of 42c.

Double-pole/double-throw switch 49 is used to simultaneously switch the states of all transmission gates 60a–e.

Pole 70a of switch 49 is used to disconnect the bus power signal line (+5v) between interface connections 34 and 36; pole 70b is used to change the state of the transmission gates. Bus power is disconnected via pole 70a to protect the powered bus from accidental shorting of the bus power signal line by the user. Such accidental shorting might arise if interface pins 36 are misaligned when a user is physically adding or removing a peripheral device with a mating Centronics type connector. When switch 49 is placed in position A, the bus power signal line (+5v) is immediately disconnected between interface connections 34 and 36. Further, in position A, each transmission gate 60a–60e in series with a signal line is immediately placed in the off state.

In position B, the bus power signal line (+5v) is immediately connected between interface connections 34 and 36. Further, immediately upon switch 49 placement in position B, a bus condition detection circuit 40c begins monitoring the SCSI bus for a bus free status. The bus free state is chosen as a safe state to perform the reconnection of the signal lines because, by definition, no data is being transmitted anywhere on the bus. Per ANSI standard X3.131, the bus free state exists when both BSY and SEL control signal lines have been continuously false for 400 nanoseconds.

After switch 49 has been placed in position B, and upon recognition of a bus free state, bus condition detection circuit 40c immediately drives transmission gates 60a–e into the on state, via J-K flip-flop 80 and transistor 82. In the preferred embodiment, the transition from the off state to the on state, after recognition of the bus free condition, occurs in less than 800 nanoseconds to ensure that the reconnection of the signal lines occurs during the bus free condition, or during the bus free delay period which immediately follows the bus free phase. By definition, all SCSI devices must wait a minimum of a bus free delay (800 nanoseconds) after detection of the bus free phase, before arbitrating for control of the bus. The arbitration phase allows one SCSI device to gain control of the bus so that it can initiate or resume an I/O process. Thus, any signal noise resulting from the reconnection of signal lines 50a and 50b by transmission gates 60a–e will occur only during the bus free condition, or during the bus free delay that follows. This ensures that, during the entire time needed to reconnect signal lines 50a to 50b, no data is being transmitted elsewhere on the bus. It should be noted that any bus condition during which no data is being transmitted may be considered a safe condition for performing the reconnection of signal lines 50a and 50b.

Thus, switch 49 in position A effectively protects the powered bus from any signal noise that might appear at interface connection 36, resulting from the addition or removal of a SCSI peripheral to interface connection 36. Also, in position A, because logic ground signal lines 42c are not interrupted, this ensures that a logic ground connection is established prior to the connection of signal lines 42a when a peripheral device is engaged to interface connection 36. Further, the logic ground connection is maintained until after the disconnection of signal lines 42a when a peripheral device is disengaged from interface connection 36.

Also included in circuit 40b is a bipolar LED D1. When switch 49 is in position A, LED D1 illuminates a red color. When switch 49 is in position B, and only after bus condition detection circuit 40c has driven transmission gates 60a–e into the on state, LED D1 illuminates a green color.

Circuits 40b, 40c, and 40d are all powered by connection to the bus power signal line (+5v) through auto-resetting fuse 52. Fuse 52 is rated at 0.9 ampere, and is designed to blow open when current exceeds 0.9 ampere, and reset approximately 20 seconds after current falls below 0.9 ampere. This protects the host computer 10 (FIG. 2) bus power supply from damage in the event a peripheral device added has a short circuit from its bus power signal pin to ground. Further, by placing fuse 52 between the bus power signal line and circuits 40b–d, LED D1 will turn off in the event fuse 52 blows open, indicating to the user that the fuse has opened. This is a useful diagnostic indicator.

OPERATION OF INVENTION

Referring again to FIG. 4, the operation of circuits 40a–d will now be discussed. During normal operation of computer system 10 (FIG. 2), circuits 40a–d should not interfere with normal data transactions between CPU 12 (FIG. 2) and any of the peripheral devices 14a–14d (FIG. 2). This is accomplished by placing switch 49 in position B. When switch 49 is in position B, the terminators 48a and 48b will receive proper supply voltage and operate to provide active termination on signal lines 42a in compliance with the requirements of the SCSI bus protocol. Furthermore, transmission gates 60a–e are in the on state, and data may be transmitted normally through them. LED D1 illuminates green when switch 49 is in position B and thus provides an indication that data is being transmitted normally through connector 30 (FIG. 3).

In the preferred embodiment, when it becomes necessary or desirable to disconnect or connect a device from the powered system 10 (FIG. 2), the user may activate a software program supplied with connector 30. This software provides a series of screens, which when navigated, aid the user in executing the proper steps required to disconnect or connect a peripheral device.

Figure 5:
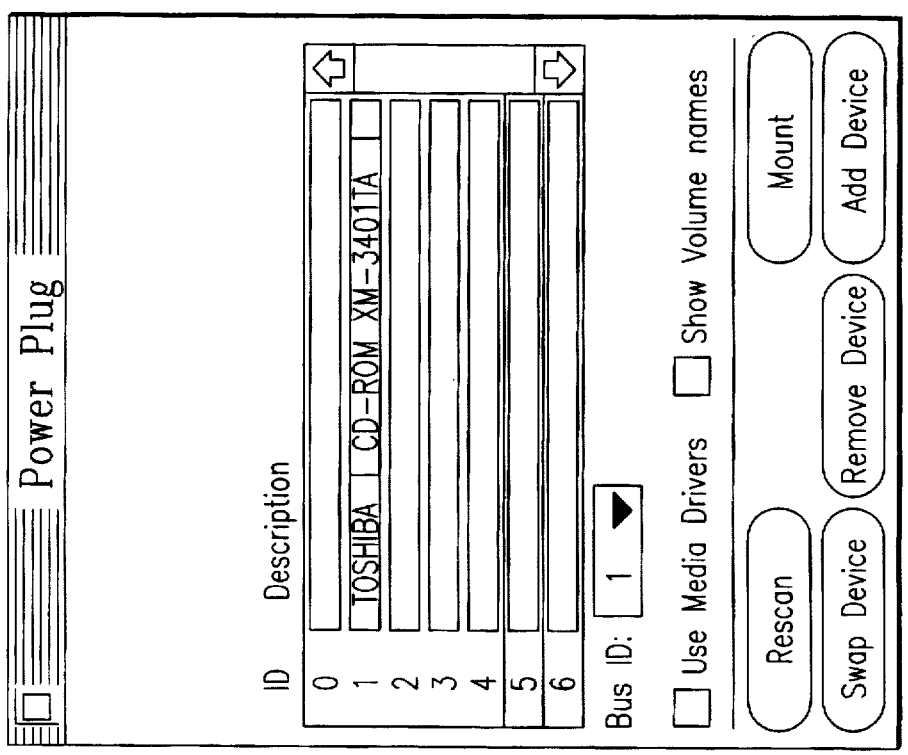
FIG. 5 is a diagram showing the main screen of computer software program that enables the hot-swapping procedure.

Referring to FIG. 5, the main screen of said software program is shown, with buttons corresponding to various user options, including: Add Device, Remove Device, and Swap Device. The Add Device button enables the user to add a device to the SCSI chain. After clicking on this button, on-screen instructions are given to place the switch on the connector in position A and then connect a device. After the device is connected, the user dismisses a dialog box, and further instructions are given to place the switch on the connector in position B. The software will then load a device driver into system memory (if appropriate for the device type) and mount any associated volumes to the desktop. The Remove Device button will unmount all associated volumes, close the device driver, and present similar instructions for device removal. The Swap Device button accomplishes the combined steps of Remove Device and Add Device, streamlining the procedure.

Just before a device is to be added to or removed from the powered bus, the user is instructed to place switch 49 in position A. This will cause the bus power signal line (+5v) to be interrupted, and all transmission gates 60a–e to turn off. This creates an open circuit condition such that the bus power, control, and data signal lines of interface connection 36 are electrically disconnected from the bus power, control, and data signal lines of interface connection 34, in a one to one correspondence. Such an open circuit condition protects the powered bus from signal noise arising from the engagement or disengagement of the peripheral device to the bus, and further protects the bus from any signal present at the peripheral device, during engagement or disengagement from the powered bus, which might damage other devices on the bus, or corrupt data being transmitted on the bus. Additionally, when switch 49 is placed in position A, LED D1 is biased such that it is illuminated red, an indication that no data can pass through connector 30, and that it is safe to add or remove a peripheral device from interface connection 36.

Once switch 49 is placed in position A, the Centronics-type interface connection 36 of connector 30 can be physically connected or disconnected from a SCSI peripheral device, for example peripheral device 14d (FIG. 2). As described above, the logic ground signal lines are not affected by circuits 40b–40d. This ensures that when switch 49 is in position A, and during connection of a device to interface connection 36, the logic ground is established before signal lines 42a. Further, when switch 49 is in position A, and during disconnection, the logic ground is maintained until after signal lines 42a have been disconnected.

After connection of a peripheral device has been made to connector 30, and at the appropriate time according to the software program, switch 49 may be placed in position B. In position B, after a bus free condition has been detected by circuit 40c, the signal lines of 42a will be reconnected from the interface connection 36 to the interface connection 34.

Disconnecting or connecting the connector from a peripheral device in such a manner allows the SCSI bus to be maintained in a proper state, as required by the SCSI protocol, and protects the integrity of data being transmitted on the bus while peripheral devices are added or removed. It can be seen therefore that the invention described above eliminates the need to power down the computer system (and other SCSI devices) as required of prior art systems.

Having described a preferred embodiment of the invention, it will now become apparent, to one of skill in the art, that other embodiments incorporating its concepts may be used. It is felt therefore, that this invention should not be limited to the disclosed embodiment, but rather should be limited only by the spirit and scope of the appended claims.

What is claimed is:

1. An apparatus for coupling and decoupling a peripheral device to a powered bus having associated therewith including:

a first plurality of signal lines including a first logic ground signal line, first bus power signal line;

first control and data signal lines, said peripheral device having associated therewith a second plurality of signal lines including a second logic ground signal line, second bus power signal line, second control and data signal lines, said apparatus further comprising:

an in-line connector electromechanically coupled between said peripheral device and said powered bus providing signal levels on each of said first plurality of signal lines, the connector further comprising a termination circuit coupled to said signal lines, including active terminators; and circuit means for maintaining and protecting signal levels while said peripheral device is being disconnected from said powered bus.

2. The apparatus of claim 1 further comprising means for indicating that said peripheral device can safely be removed from said powered bus.

3. The apparatus of claim 1 further comprising means for maintaining said signal levels after said peripheral device has been disconnected from said powered bus.

4. The apparatus of claim 1 wherein said means for maintaining said signal levels while said peripheral device is being connected to said powered bus includes:

means for providing, before coupling said peripheral device to said powered bus, an open circuit between said first bus power signal line, said first control and data signal lines and said second bus power signal line, said second control and data signal lines respectively;

means for coupling said first logic ground signal line to said second logic ground signal line prior to coupling remaining ones of said first plurality of signal lines to said second plurality of signal lines;

means for providing a closed circuit between said first bus power signal line and said second bus power signal line;

means for detecting a bus condition during which it is safe to couple said first bus control and data signal lines to said second bus control and data signal lines respectively; and means for coupling, after detection of said safe bus condition, said first control and data signal lines to said second control and data signal lines respectively.

5. The apparatus of claim 1 wherein said means for maintaining said signal levels while said peripheral device is being disconnected from said powered bus includes:

means for providing, before decoupling said peripheral device from said powered bus, an open circuit between said first bus power signal line, said first control and data signal lines and said second bus power signal line, said second control and data signal lines respectively;

means for decoupling said first logic ground signal line from said second logic ground signal line after decoupling said remaining ones of said first plurality of signal lines from said second plurality of signal lines.

6. The apparatus of claim 1 wherein said bus operates in conformity with a Small Computer Systems Interface bus protocol.

* * * * *